(12) United States Patent
Elliott

(10) Patent No.: US 6,766,766 B1
(45) Date of Patent: Jul. 27, 2004

(54) PET CARE CENTER WITH REFRIGERATED AUTOMATIC FEEDER

(76) Inventor: Lawrence T. Elliott, 34789 E. End, Round Lake, IL (US) 60073

( * ) Notice: Subject to any disclaimer, the term of this patent is extended or adjusted under 35 U.S.C. 154(b) by 0 days.

(21) Appl. No.: 10/113,787

(22) Filed: Mar. 29, 2002

Related U.S. Application Data

(60) Provisional application No. 60/279,836, filed on Mar. 29, 2001.

(51) Int. Cl.[7] ............................................. A01K 1/00
(52) U.S. Cl. ............................ 119/57.92; 119/51.12
(58) Field of Search ............................. 119/57.92, 53, 119/51.01, 51.02, 51.11, 51.12, 61

(56) References Cited

U.S. PATENT DOCUMENTS

| | | | | |
|---|---|---|---|---|
| 2,791,984 A | * | 5/1957 | Franklin | ................... 119/51.12 |
| 4,044,722 A | | 8/1977 | Bradshaw | |
| 4,249,483 A | * | 2/1981 | Sobky | ..................... 119/51.12 |
| 4,501,229 A | * | 2/1985 | Williamson | ............... 119/51.12 |
| 4,617,874 A | * | 10/1986 | Zammarano | .............. 119/51.12 |
| 4,665,862 A | | 5/1987 | Pitchford | |
| 4,993,364 A | | 2/1991 | Hessenauer | |
| 5,299,529 A | | 4/1994 | Ramirez | |
| 6,205,950 B1 | * | 3/2001 | Thompson, Jr. | ........... 119/51.5 |
| 6,349,671 B1 | * | 2/2002 | Lewis et al. | ............. 119/51.02 |
| 6,363,886 B1 | * | 4/2002 | Statton | ...................... 119/51.5 |

FOREIGN PATENT DOCUMENTS

GB      2037140 A   *   7/1980

* cited by examiner

Primary Examiner—Yvonne R. Abbott
(74) Attorney, Agent, or Firm—Jon C. Gealow

(57) ABSTRACT

A pet care center with refrigerated automatic feeder. A carousel type food tray is divided into a plurality of pie shaped containers, with an adjacent pair of containers made accessible to a pet, and the others maintained in a refrigerated condition in a refrigerated compartment of the pet care center. A tray for receiving animal waste is attachable to the refrigerated compartment.

2 Claims, 3 Drawing Sheets

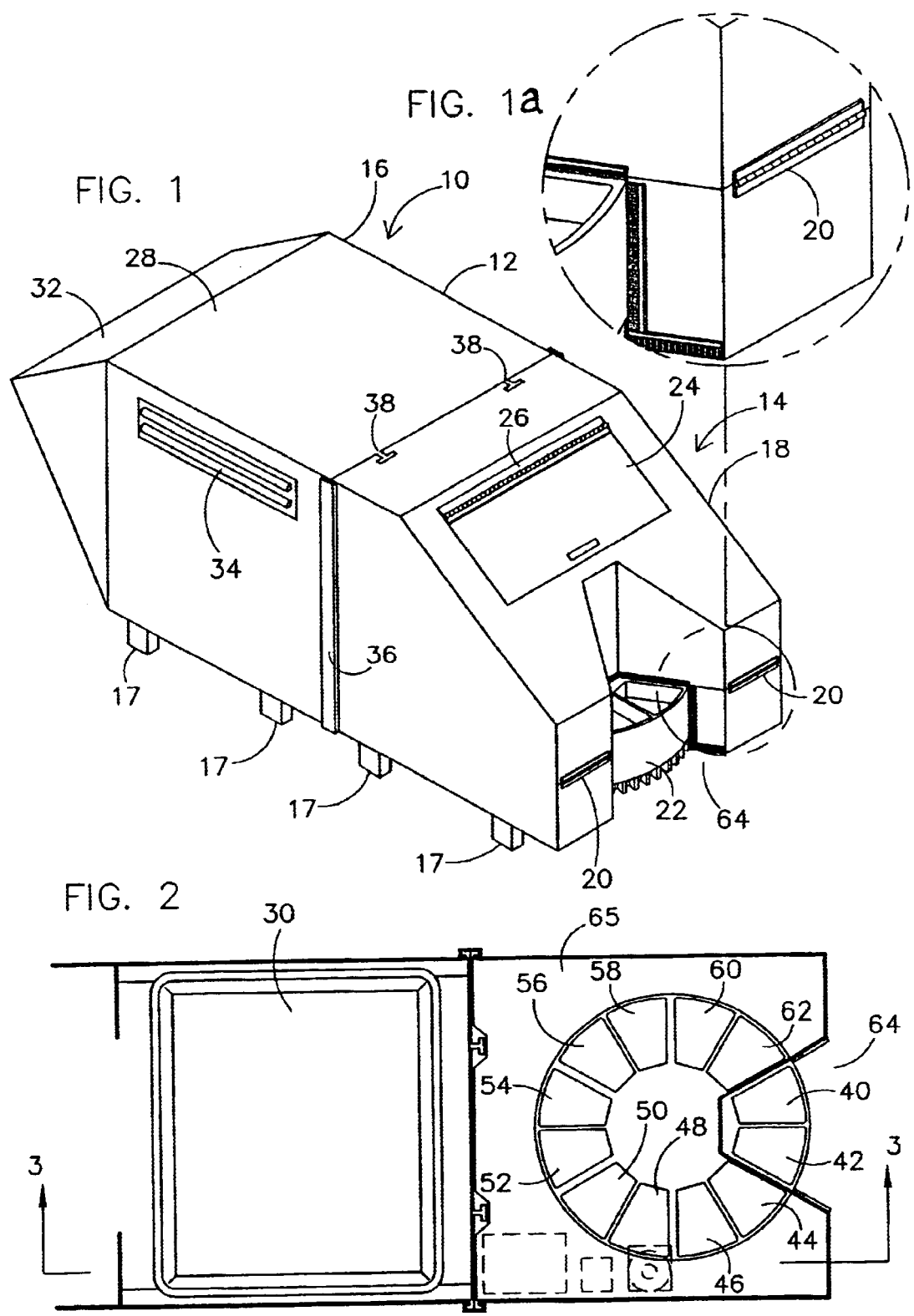

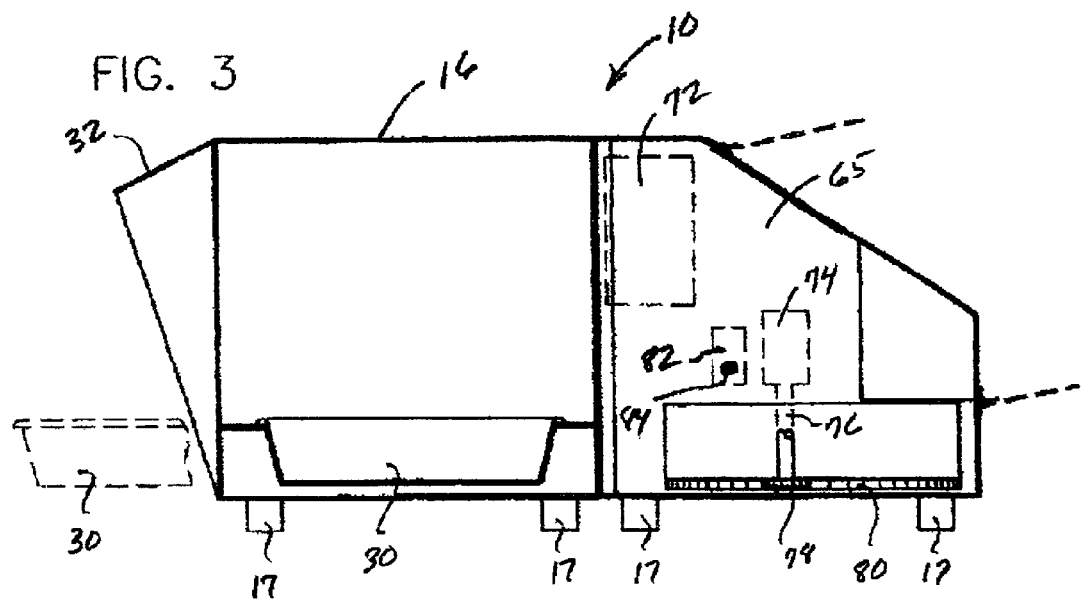
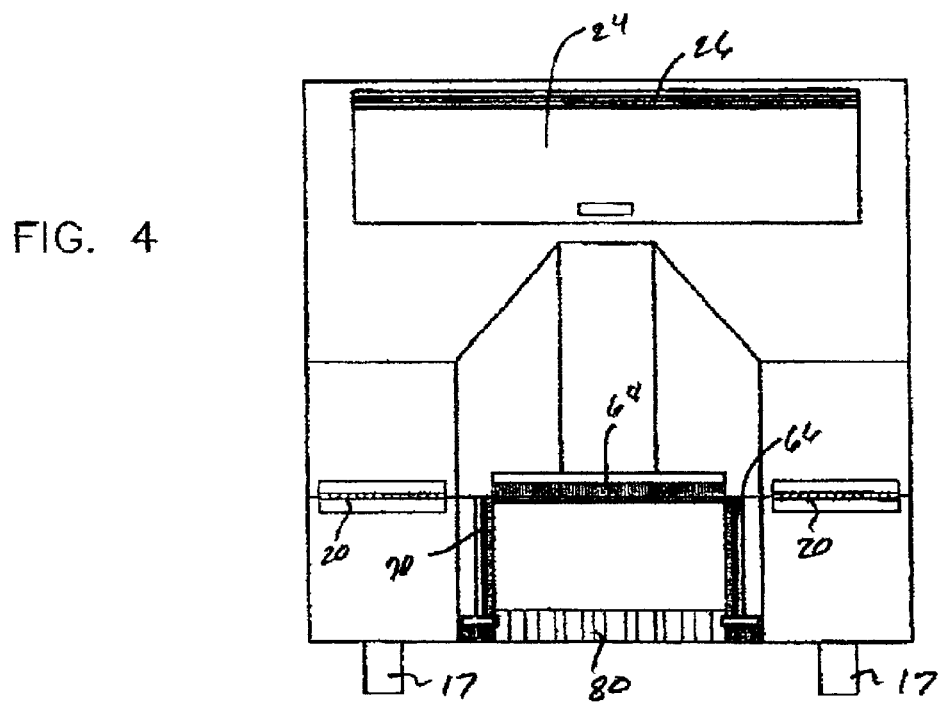

PET CARE CENTER WITH REFRIGERATED AUTOMATIC FEEDER

CROSS-REFERENCE TO RELATED APPLICATIONS

The following U.S. Patent application is hereby incorporated by reference in its entirety for its teachings:

U.S. application No. 60/279,836 for REFRIGERATED AUTOMATIC FEEDER by Lawrence T. Elliott, filed Mar. 29, 2001.

FIELD OF THE INVENTION

The present invention relates to a device for automatically feeding an animal, for instance, a pet dog or cat. More particularly it relates to a device which preserves and makes available food to an animal on a predetermined schedule.

BACKGROUND OF THE INVENTION

It is often desirable to be able to provide sustenance to an animal such as a pet, during the absence of the person responsible for caring for the animal. In providing the sustenance to the animal it is often desirable to provide the nourishment on a predetermine schedule. Further, to maintain the quality of the food and to make it more palatable to the animal it is necessary to keep the food at lower temperature than that of the surrounding environment.

Accordingly, it would be advantageous to provide an animal care center which makes food available to an animal on a regular schedule. It would be further desirable to provide both food and water on a predetermined schedule. It would also be desirable to maintain the food, and water if provided, at a lower temperature to preserve the food and make the water more desirable.

SUMMARY OF THE INVENTION

It is an object of this invention to provide an automatic feeder for an animal which makes food available to the animal at periodic intervals. It is a further object of this invention to refrigerate the food when it is not available to the animal. It is still another object of this invention to provide for animal waste disposal in conjunction with the automatic feeder.

The automatic feeder of this invention refrigerates multiple servings of food and water, and presents according to a predetermined time schedule a serving of food and water to an animal such as a pet cat or dog. A circular food tray is provided with pie shaped serving containers on its top surface. In a preferred embodiment the serving containers are provided in adjacent pairs, with pie shaped spacers between adjacent pairs. The circular food tray is mounted for rotation within a refrigerated compartment. In the preferred embodiment an opening is provided in the refrigerated compartment such that an adjacent pair of the serving trays is accessible to an animal for consuming the material placed in the adjacent pair of serving trays. For instance one of the trays may contain water, and the other a food which must be kept refrigerated to prevent spoiling. Typical of such foods would be canned cat and dog food.

In a preferred embodiment of this invention, the refrigeration unit is similar to those used in the typical small chest type refrigerator.

Suitable flexible insulating means provided closure between the tray and the refrigerated compartment, For instance, a double brush cold stop may be provided between the top and side surfaces of the tray. The brushes being in engagement with the top surface of the pie shaped spacers between adjacent pairs of serving containers, when the circular tray is not rotating.

The circular tray is connect by a drive train to a motor. When the motor is energized, the tray is caused to rotate. Energization of the motor is controlled by a timer. The timer can be programmed to cause the motor to be energized periodically, such as every ten minutes for a sufficient amount of time, to rotate the tray to bring a succeeding pair of adjacent serving trays into the opening. With this arrangement, a pair of trays, containing for instance food and water is always accessible by an animal, but if not consumed, is again refrigerated, such that it will not spoil. In an alternative arrangement, the timer may start the motor periodically, such as every ten minutes, and a micro switch positioned to be actuated by projections on the tray to shut off the motor when the next pair of trays is positioned in the opening.

While the previously described rotation of the circular tray would be appropriate for an animal which does not over-eat, it would not be appropriate for an animal which would tend to eat all of the food presented to it. For animals of the later type, the timer would be programmed to rotate at less frequent intervals, such as only two or three times a day. When used in this manner, with food and water in adjacent trays, water would have to be otherwise made available to the animal.

BRIEF DESCRIPTION OF THE DRAWINGS

FIG. 1 is a front perspective view, of the pet care center with refrigerated automatic feeder of this invention.

FIG. 1a is an enlarged view of the from of the pet care center showing details of the hinged cover.

FIG. 2 is a top plan view with the front and back covers removed of the pet care center shown in FIG. 1;

FIG. 3 is side elevation view of the pet care center shown in FIG. 1, with the outside side wall partially removed to show some of the internal components, with other internal components shown by dashed lines;

FIG. 4 is a front elevation view of the pet care center shown in FIG. 1, with the center lower portion of the front removed to show a portion of the drive mechanism;

DETAILED DESCRIPTION OF THE PREFERRED EMBODIMENT

Figure 5:
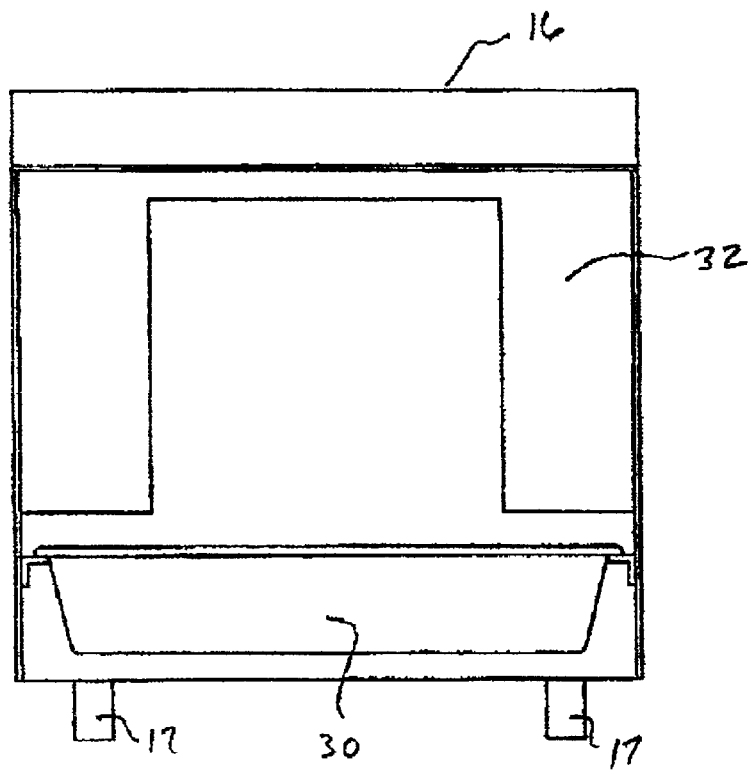
FIG. 5 is a rear elevation view of the pet care center shown in FIG. 1.

Referring to FIG. 1, the pet care center 10 of this invention includes an outer housing 12, which includes automatic feeder 14 at one end of the housing and a waste disposal center 16 at the other end of the housing. Legs 17 are provided on both the automatic feeder 14 and the waste disposal center 16 for supporting them on an underlying surface. The cover 18 for the automatic feeder 14 is hinged for opening at its lower front edge by hinges 20 shown in FIG. 1 and in further detail in FIG. 1a. The cover 18 is opened to gain access to a carousel type food tray 22 for cleaning. However, a door 24 is provided for adding food or water to the carousel type food tray 22. The door 24 is hingedly mounted by a hinge 26 at its top edge to the cover 18.

The waste disposal center 16, includes a rectangular housing 28, which receives a tray 30 for collecting animal waste. Typically, the tray would be partially filled with a waste disposal litter. A hood like cover 32 is provided at the open end the waste disposal center 16. Vents 34, one of which is shown, are provided in the sidewalls. The waste disposal center 16 is secured to the automatic feeder by a pair of U-shaped channels 36 on the sides, and a pair of T-shaped keys and sockets 38 on the top.

Figure 6:
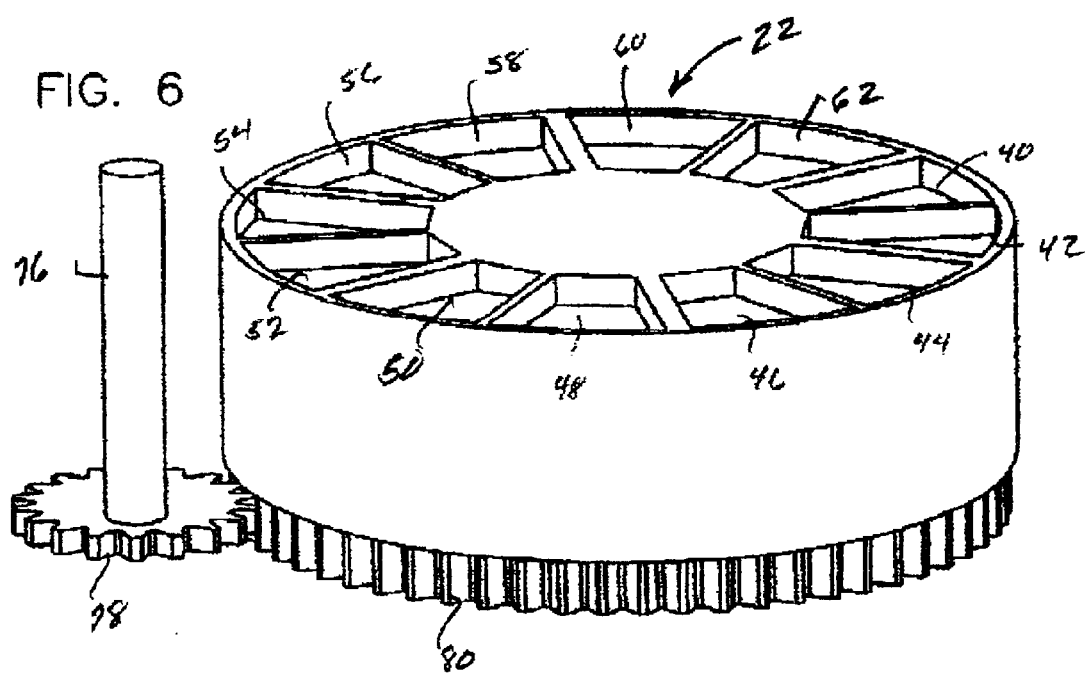
FIG. 6 is perspective view of the carousel tray drive mechanism of the pet care center shown in FIG. 1.

Referring to FIGS. 2 and 6, the carousel type food tray 22 is divided into a plurality of pie shaped containers, 40, 42, 44, 46, 48, 50, 52, 54, 56, 58, 60, and 62. As shown in FIGS. 1 and 2, two adjacent trays 40 and 42 are exposed in the opening 64 in the front of the automatic feeder 14. All of the trays, other than trays 40 and 42 are positioned in the space 65, within the automatic feeder 14 housing. Flexible seals, such as brushes 66, 68, and 70 are provided to maintain a seal between the exposed containers 40 and 42 and the space 65 within the automatic feeder housing. Other flexible insulating devices may provide closure between the tray and the refrigerated compartment. For instance, a flexible flap may be provided between the top and side surfaces of the tray. The flaps being in engagement with the top surface of the pie shaped spacers between adjacent pairs of serving containers, when the circular tray is not rotating.

A refrigeration unit 72 is provided to maintain the space 65 at a lower temperature, such as the temperature normally maintained in a refrigerator. In a preferred embodiment of this invention, the refrigeration unit is similar to those used in the typical small chest type refrigerator.

A motor 74 is provided for rotating the carousel type food tray 22. The motor shaft 76 is provided with a gear 78 which engages teeth 80 provided along the lower edge of the carousel type food tray 22, as is best seen in FIG. 6. Energization of the motor 74 is controlled by a control circuit 82. The control circuit or timer 82 will cause the motor 74 to be energized periodically for an interval of time long enough to rotate the tray 22 such that the two exposed containers are moved into the space 65 and an adjacent pair of containers are exposed. For instance, referring to FIG. 2, clockwise rotation of the tray 22 will cause containers 40 and 42 to move into the space 65 and containers 60 and 62 will be exposed for access by the animal to be fed. The control circuit 82 is provided with a control 84 for adjusting the length of time between rotations of the tray 22.

The control circuit or timer 82 can be programmed to cause the motor to be energized periodically, such as every ten minutes for a sufficient amount of time, to rotate the tray to bring a succeeding pair of adjacent serving trays into the opening. With this arrangement, a pair of trays, containing for instance food and water is always accessible by an animal, but if not consumed, is again refrigerated, such that it will not spoil. In an alternative arrangement, the timer or control circuit 82 may start the motor periodically, such as every ten minutes, with a micro switch positioned to be actuated by projections on the tray to shut off the motor when the next pair of trays is positioned in the opening.

While the previously described rotation of the circular tray would be appropriate for an animal which does not over-eat, it would not be appropriate for an animal which would tend to eat all of the food presented to it. For animals of the later type, the timer or control circuit 82 would be programmed to rotate at less frequent intervals, such as only two or three times a day.

In a typical application of the automatic feeder 14, alternate containers are provided with food and water, such that a container of water and a container of food is exposed. The food may be of the canned type, which if not refrigerated would tend to spoil.

While only one embodiment of the invention has been shown, it should be apparent to those skilled in the art that what has been described is considered at present to be a preferred embodiment of the pet care center with refrigerated automatic feeder of this invention. In accordance with the Patent Statute, changes may be made in the pet care center with refrigerated automatic feeder without actually departing from the true spirit and scope of this invention. The appended claims are intended to cover all such changes and modification which fall in the true spirit and scope of this invention.

What is claimed is:

1. An animal care center comprising:
    a refrigerated compartment,
    a tray divided into a plurality of containers,
    a first pair of said containers being accessible by an animal, and the remainder of said containers being located in said refrigerated compartment,
    a drive arrangement for causing said tray to be moved so as to move said first pair of said containers into said refrigerated compartment and making a second pair of said containers accessible to an animal and including an animal waste disposal center removably connect to said refrigerated compartment.

2. The animal care center of claim 1, wherein said animal waste disposal center comprises an enclosure for receiving a tray for the collection of waste.

\* \* \* \* \*